United States Patent [19]

Kozima

[11] 4,274,114
[45] Jun. 16, 1981

[54] PICTURE INFORMATION TRANSMITTING METHOD FOR FACSIMILE

[75] Inventor: Yasuyuki Kozima, Hitachi, Japan
[73] Assignee: Hitachi, Ltd., Tokyo, Japan
[21] Appl. No.: 90,430
[22] Filed: Nov. 1, 1979
[30] Foreign Application Priority Data
Nov. 6, 1978 [JP] Japan .................. 53-135811
[51] Int. Cl.³ .................. H04N 1/32; H04N 1/36
[52] U.S. Cl. .................. 358/257; 179/2 DP
[58] Field of Search .................. 358/257, 280, 256; 179/2 DP

[56] References Cited
U.S. PATENT DOCUMENTS

| 2,483,449 | 10/1949 | Wise | 358/257 |
|---|---|---|---|
| 3,678,180 | 7/1972 | Bond | 358/257 |
| 4,153,916 | 5/1979 | Miwa | 358/257 |

Primary Examiner—Howard W. Britton
Attorney, Agent, or Firm—Craig and Antonelli

[57] ABSTRACT

A picture information transmission method for a facsimile system. When the picture information for a plurality of documents are transmitted successively in the same transmitting mode, at least the group identifying signal and the group command signal are omitted from transmission. The omission of such signals is informed previously to the receiver so that the receiver is maintained in the state ready for receiving and according the picture information signals transmitted thereto successively in the same mode.

8 Claims, 13 Drawing Figures

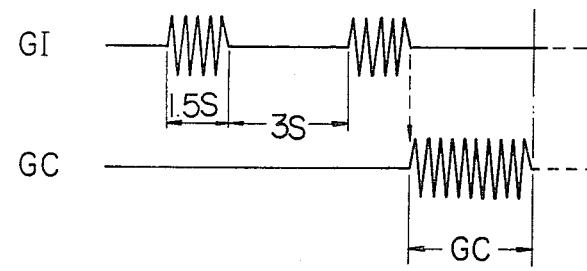
FIG. 2a PRIOR ART GI
FIG. 2b PRIOR ART GC
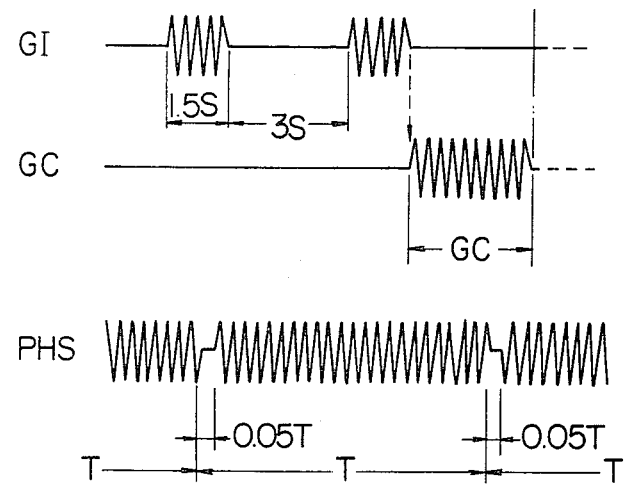
FIG. 2c PRIOR ART PHS
FIG. 2d PRIOR ART CFR
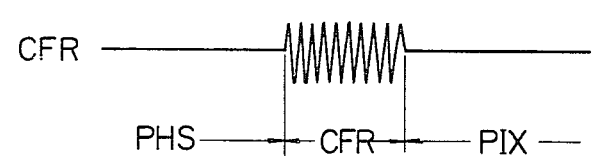
FIG. 2e PRIOR ART EOM
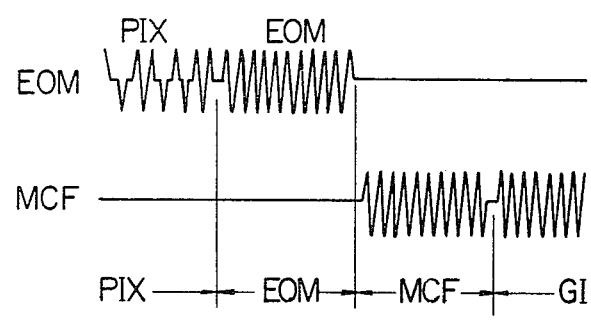
FIG. 2f PRIOR ART MCF

PICTURE INFORMATION TRANSMITTING METHOD FOR FACSIMILE

The present invention relates in general to a method of transmitting picture information in facsimile systems and in more particular to a picture information or data transmission systm which is adapted to transmit continuously and successively individual picture information of plural documents in a same transmitting mode.

Several specifications and standards on facsmile telegraphy are reported in the CCITT's Recommendation issued in 1976. Among them, there is proposed Group II type apparatus which is intended for the facsimile telegraphy of an analog transmission type utilizing a band compression technic. In the first place, a picture information transmission principle adopted in the Group II type apparatus will be briefly reviewed by referring to FIGS. 1 and 2.

FIG. 1 illustrates signal transmitting procedures between a facsimile transmitter 100 and a receiver 200. Upon power being turned on, the receiver 200 sends a group identifying signal GI to the transmitter 100 to inform that the receiver 200 is in a reception admitting mode. When the group identifying signal GI is detected by the transmitter 100, the latter determines the transmitting mode in accordance with the contents of the group identifying signal GI and sends to the receiver 200 a group command signal GC upon termination of the signal GI to thereby inform that the transmitter 100 is in the sending mode. In response to the received group command signal GC, the receiver 200 establishes the commanded receiving mode and stands by in the ready condition. In succession to the group command signal GC, the transmitter sends a phasing signal PHS which serves as a reference signal for synchronizing the scanning phase between the transmitter and the receiver. The receiver 200 responds to the phasing signal PHS by establishing the matched scanning phase and stands by in the phase matched state. Upon termination of the phasing signal PHS, the receiver 200 sends out a confirmation-to-receive signal or reception-ready signal CFR and is set to a picture information or message receiving mode. Upon reception of the signal CFR which represents that the receiver 200 is in the picture information receiving mode, the transmitter 100 sends a picture information signal PIX of a first document. When the transmission of the picture information of the first document has been completed, the transmitter sends out an end-of-message signal EOM in response to which the receiver 100 sends out a message confirmation signal MCF upon termination of the signal EOM. By detecting the signal MCF, the transmitter 100 confirms the completed transmission of the picture information of the first document. Similar transmitting and receiving procedures are repeated for the transmission of the picture information of the second and succeeding documents. When the picture information of the last document has been completed, the transmitter 100 is turned off, whereby the group command signal GC disappears. Consequently, the receiver 200 determines that the facsimile transmission has been completed and is thus turned off.

It is assumed that the preparatory preceding procedures for the signals GI and GC are performed during an interval A, the phasing procedures for the signals PHS and CFR are performed during an interval B, the transmission of the picture information signal PIX takes place during an interval C, and that the posterior procedures for the signal EOM and MCF are performed during an interval D, as is illustrated in FIG. 1. Under the assumption, the procedures for the intervals A, B, C and D are executed for every information document to be transmitted.

Referring to FIGS. 2a to 2f which show waveforms of the signals used in the procedures described above for the Group II type apparatus, the group identifying signal GI is constituted by a train of sine waves each having a frequency of 1850 Hz and a duration of 1.5 sec. and repeated after a rest interval of 3.0 sec. The group command signal GC is constituted by a sine wave signal having a frequency of 2100 Hz and produced from the transmitter for three sec. in succession to the termination of the group identifying signal GI sent out from the receiver. The phasing signal PHS is a carrier of 2100 Hz which has undergone AM-PM modulation so that synchronizing blanks appear for every period T of 1/6 sec. and have a duration corresponding to about 5% of the period T, while the carrier is phase-inverted after every blank. The reception-ready (confirmation-to-receive) signal CFR is constituted by a train of sine waves each having a frequency of 1650 Hz and a duration of 3 sec. and represents that in response to the detected phasing signal PHS, the scanning phase of the receiver has been synchronized to the phasing signal. During the reception of the reception-ready signal CFR, the transmitter is in the idle state without producing no signal. For the picture information or message signal PIX, use is made of a signal which has undergone AM-PM-VSB modulations. The end-of-message signal EOM is a sine wave signal of 1100 Hz having a duration of 3 sec. and transmitted in succession to the picture information signal PIX. The message confirmation signal MCF is a sine wave signal having a frequency of 1650 Hz and a duration of 3 sec. Referring to FIG. 3, it is noted that phase discriminating waveform of the phasing signal PHS is different from that of the picture information signal PIX. Further, the reception-ready or confirming signal (confirmation-to-receive signal) CFR intervenes between the signals PHS and PIX. Consequently, the synchronizing signal is temporally unavailable during the signal CFR. However, the phase-synchronized state once established between the transmitter and the receiver is held, because the receiver incorporates generally a crystal oscillator which is capable of oscillating at the synchronous frequency.

In the case of the conventional facsimile transmission, the duration of the picture information signal PIX is generally in a range of 1.5 to 3 minutes for a document or original of A-4 size. More specifically, in the case of T-3 type apparatus as stipulated in CCITT's Recommendation T-3, the transmission time of picture information for a single document may amount to 3 minutes. However, when the line density is changed or line skip is made for blank arears, the time required for the transmission of picture information is reduced to less than 3 minutes. Of course, the intervals A, B and D are added to the time for the transmission of the picture information. The single group identifying signal GI will require 19.5 sec. which is about 20% of 1.5 minutes. Since the group identifying signal GI has to be produced for every document in case where a number of documents are successively transmitted, a lot of time is required for the preparatory preceding procedure A described hereinbefore. For example, when 30 sheets of documents of A4 in size are to be transmitted in succession, the total sum of the time taken for the preparatory procedures A will amount to about 10 minutes, to a great disadvantage from the economical viewpoint.

As will be appreciated from the above description, in the case of the facsimile system of the analog signal transmission type in particular, the time required for transmission of the preparatory signals for establishing a transmission channel takes a relatively large proportion as compared with the time required for transmission of the picture information or message signals when a number of documents are to be successively transmitted. Further, due to the fact that a tonal signal of a predetermined constant frequency is used for the preparatory signals in the case of analog signal transmission, a signal duration in a range of 1 to 3 seconds is required in order to assure a reliability in the signal descrimination, which thus involves the preparatory time duration of 10 to 20 seconds as the commands and the responses are repeated. Such being the circumstance, the utilization efficiency of communication line or channel is remarkably degraded.

Accordingly, a primary object of the present invention is to provide a picture information transmitting method for a facsimile telegraphy system which is capable of reducing the preparatory time for the transmission of a second and succeeding documents or originals in a successive transmission for a number of documents in one and the same transmission mode.

In view of the above and other objects which will become more apparent as description proceedes, there is proposed according to a general aspect of the invention a picture information transmitting method for a facsimile system comprising steps of sending a group identifying signal by a receiver informing that the receiver is in a reception-ready mode, transmitting a group command signal by a transmitter which has determined a transmitting or sending mode in response to the received group identifying signal, transmitting a phasing signal by the transmitter in succession to termination of the group command signal, sending a reception-ready (confirmation-to-receive) signal by the receiver when preparatory conditions for receiving picture information have been established in the receiver on the basis of the group command signal and the phasing signal, transmitting the picture information signal of document to be transmitted in facsimile telegraphy by the transmitter after the reception of the receiption-ready signal, recording the picture information as received by the receiver, transmitting an end-of-message signal by the transmitter upon completed transmission of the picture information signal of the document, sending a message confirmation signal by the receiver after reception of the end-of-message signal, wherein upon transmission of the picture information of a second document in succession to the picture information of the first document in the same transmitting mode, the transmission and the reception of at least the group identifying signal and the group command signal are omitted, which omission is previously informed to the receiver so that the receiver remains in the state ready for reception of the picture information of the second document, whereby the picture information of the second document as sent out from the transmitter is immediately received and recorded by the receiver.

The above and other objects, novel features and advantages of the present invention will become more apparent from the following description of preferred embodiments taken in conjunction with the accompanying drawings, in which:

FIGS. 2a to 2f and FIG. 3 show signal diagrams to illustrate waveforms of various signals used in the facsimile telegraphy illustrated in FIG. 1;

Figure 4:
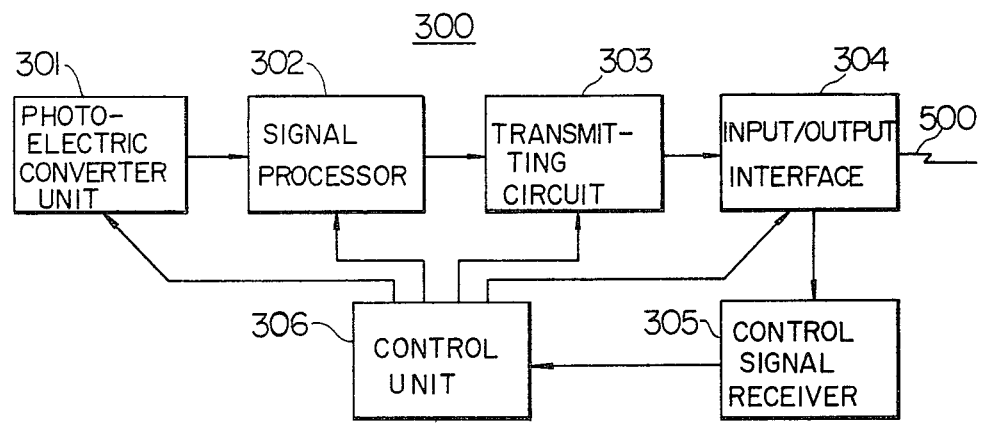
FIGS. 4 and 5 are block diagrams to show arrangements of a transmitter and a receiver, respectively, which are used in carrying out the method according to the invention.
Figure 5:
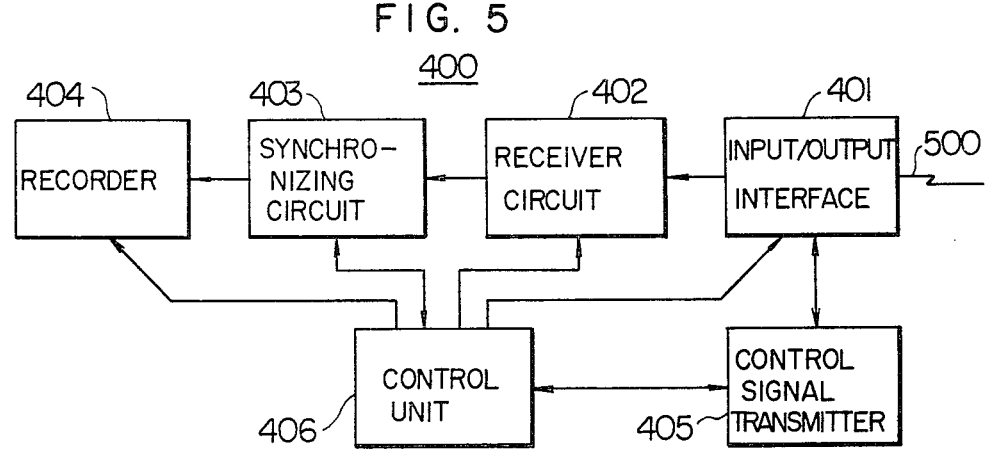

Now, referring to FIGS. 4 and 5 which show, respectively, a transmitter and a receiver used for carrying out the picture information transmitting method in facsimile according to the invention, it should be mentioned that neither the transmitter nor the receiver differs from the circuit specifications provided in the CCITT's Recommendation (1976) in respect of circuit arrangement. Accordingly, description of the circuit arrangement will be made only briefly.

Figure 1:
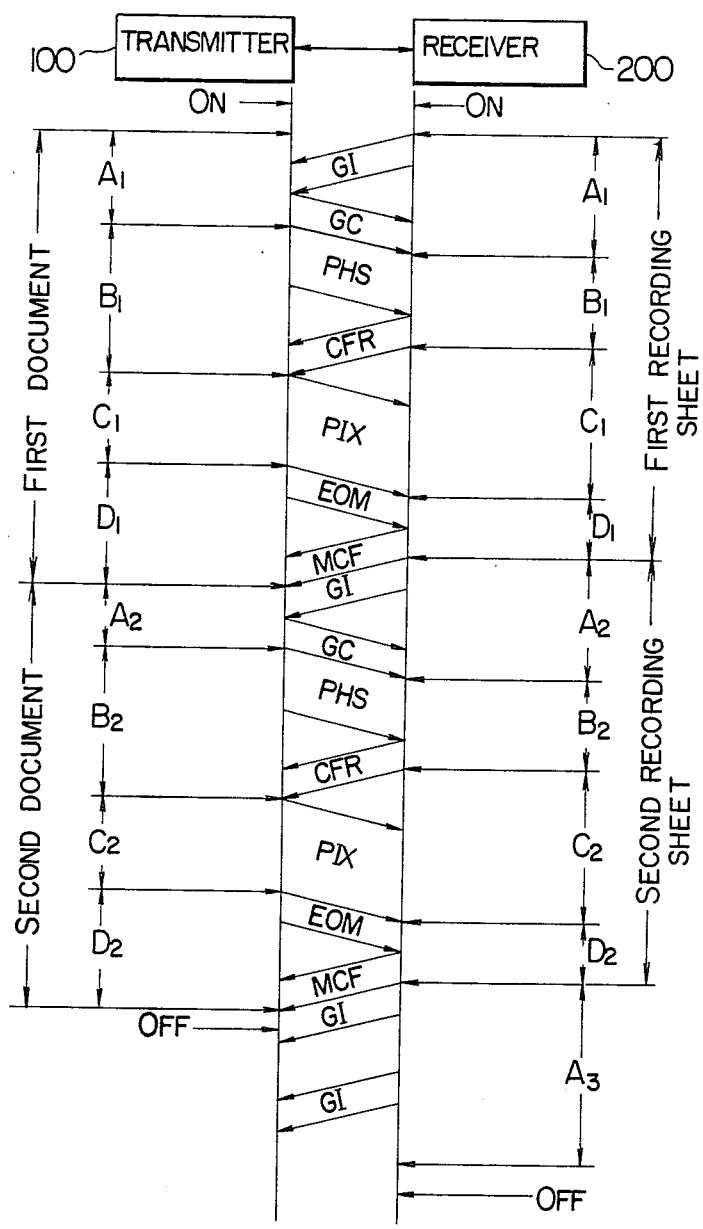
FIG. 1 is a flow chart illustrating communication in Group II type facsimile apparatus provided in CCITT's Recommendation (1976)

In FIG. 1 which shows the transmitter generally denoted by numeral 300, reference numeral 301 denotes a photoelectrical converter unit which serves to optically scanned picture information of an original document into a corresponding electric signal and includes a mechanical system, an optical system, an electric circuit system and the like. Numeral 303 denotes a picture information signal processing unit to serve for synthesizing a signal which subsequently undergoes modulation and limitation in amplitude and bandwidth in a transmitting circuit 302 connected to the output of the signal processing unit 302. The transmitter circuit 303 is adapted to produce tonal signals such as the group command signal GC, the phasing signal PHS, the end-of-message signal EOM or the like in addition to the picture information signal PIX under the command of a control unit 306. An input/output interface 304 serves to connect the transmitter 300 to a communication line 500 and functions as a network control unit when a plurality of communication lines such as a general telegraph circuit are to be serviced. A control signal receiving unit 305 receives the group identifying signal GI, the confirmation-to-receive or reception-ready signal CFR, the message confirmation signal MCF or the like. The control unit 306 serves to control the functions of the various units described above.

In precedence to the transmission of information of an original document, the positioning of the original document as well as manipulation of operating buttons are commanded from the control unit 306. As being ready to transmit a picture information, the transmitter 300 transmits and receives tonal signals through the transmitter circuit 303, control signal receiving unit 305 and input/output interface 304. The picture information or message signal PIX is transferred from the photoelectric converter unit 301 to the communication line or channel through the signal processing unit 302, the transmitting circuit 303 and the input/output interface 304, while the tonal signal flows either from the control unit 306 to the communication line 500 through the transmitter circuit 303 and the input/output interface 304 or from the communication line 500 to the control unit 306 through the input/output interface 304 and the control signal receiving unit 305. Further, the phasing signal PHS as well as phase signal component of the picture information signal PIX take a flow path extending from the control unit 306 through the signal processing unit 302, the transmitting circuit 303 and the input/output interface 304 to the communication line 500.

Referring to FIG. 5 showing a general arrangement of a receiver 400, numeral 401 denotes an input/output interface for connecting the receiver 400 to the communication line 500. Numeral 402 denotes a receiver circuit for demodulating or restoring the signals received from the communication line 500. Numeral 403 designates a synchronizing unit which serves to extract the synchronizing signal and the phasing signal from the demodulated signal and maintain synchronization for a recording unit 404. The recording unit 404 includes a mechanical system, a printing system (e.g., heat-sensitive recording head) or the like and operates to record the picture information on a recording sheet in accordance with the picture information signal PIX. There are provided also a control signal transmitter-receiver circuit 405 and a control unit 406 which have substantially similar structures and functions as those of the transmitter 300.

Upon receiving operation of the receiver 400, the input/output interface 401 is operatively connected to the counterpart transmitter 300 by way of the communication line 500 through manipulation of operator or with the aid of an automatic receiving apparatus (not shown). The sending of the tonal signals is effected through the path extending from the control unit 406 through the control signal transmitter-receiver unit 405 and the input/output interface 401 to the communication line 500, while the reception of the tonal signals is realized through the path extending from the communication line 500 through the input/output interface 401 and the control signal transmitter-receiver unit 405 to the control unit 406. On the other hand, the picture information signal takes the path extending from the communication line 500 through the input/output interface 401 the receiver circuit 402 and the synchronizing circuit 403 to the recording unit 404.

The control unit 306 of the transmitter 300 as well as the control unit 406 of the receiver 400 are programmed on the prerequisite assumption described below. In order to allow the picture information of a second document to be sent out in succession to that of the first document in the same mode with the preparatory procedures being omitted under the control of the control unit 306 of the transmitter 300, the receiver also has to be able to receive the second picture information without requiring the preparatory procedures. Upon reception of the group identifying signal GI, the transmitter 300 sends out another group command signal GC' which informs that the transmitter 300 is going to send the picture information of the send document in the same transmission mode as the one for the first document with the preparatory procedure being omitted. Since the transmitter 300 usually incorporates inherently the function to generate various tonal signals, it is easily possible to produce the second group command signal GC' whose frequency is different from the standard signal GC in addition to the signal GC. If the receiver 400 has the capability of receiving the picture information with preparatory procedure omitting mode, when the receiver 400 receives the second group command signal GC', the receiver takes for that the picture information is successively sent in the same transmission mode with the preparatory procedures being omitted. This fact is encoded and stored in a memory incorporated in the control unit 406 of the receiver. Upon termination of the phasing signal PHS, the receiver 400 sends out the reception-ready signal CFR. If the receiver 400 has not the above capability, the receiver cannot send out the signal CFR, since the receiver cannot receive the signal GC' which has a frequency different from the standard signal GC.

In the successive transmitting operation, the receiver 400 receives the end-of-message signal EOM and sends the message confirmation signal MCF after the completed transmission of the picture information of the first document. Thereafter, the receiver 400 is set to the state ready for reception of another picture information or message in the same transmission mode under the control of pertinent program without sending the group identifying signal. On the other hand, the transmitter sends the phasing signal PHS upon reception of the message confirmation signal MCF after the completed transmission of the picture information for the first original document and refers to a program for controlling the transmission of the picture information signal PIX for the second document. During the stand-by state, the receiver 400 is locked in the reception-ready state while being phase-matched by the phasing signal PHS sent from the transmitter 300. In this way, the receiver is in the position to immediately record the incoming picture information of the second or original document.

When the transmission mode is to be changed, e.g. modulation types such as AM-PM-VSB, AM-BSB, FM-DSB or the like is changed or compression of information such as line density, line skip, block skip or the like is to be changed, the control unit 306 of the transmitter 300 will send a second type of end-of-message signal EOM' informing the mode change after the completed transmission of the picture information. The second signal EOM' can be discrimated from the end-of-message signal EOM by using a frequency for the former signal EOM' different from the latter EOM. Then, the control unit 406 of the receiver 400 generates the second type of group identitying signal GI described above after the completed transmission of the end-of-message signal MCF'. On the other hand, at the side of the transmitter, a program is taken out for controlling the transmission of a new group command signal GC'', phasing signal PHS' and the picture information signal PIX' after the signal EOM' has been sent, whereby upon reception of the signal GI, the group command signal GC'' and the phasing signal PHS' are sequentially sent out in accordance with the program. The transmitter 300 takes out the program for sending the picture information upon reception of the reception-ready signal (confirmation-to-receive) CFR from the receiver 400 thereby to send the picture information signal PIX' in accordance with the program.

Figure 6:
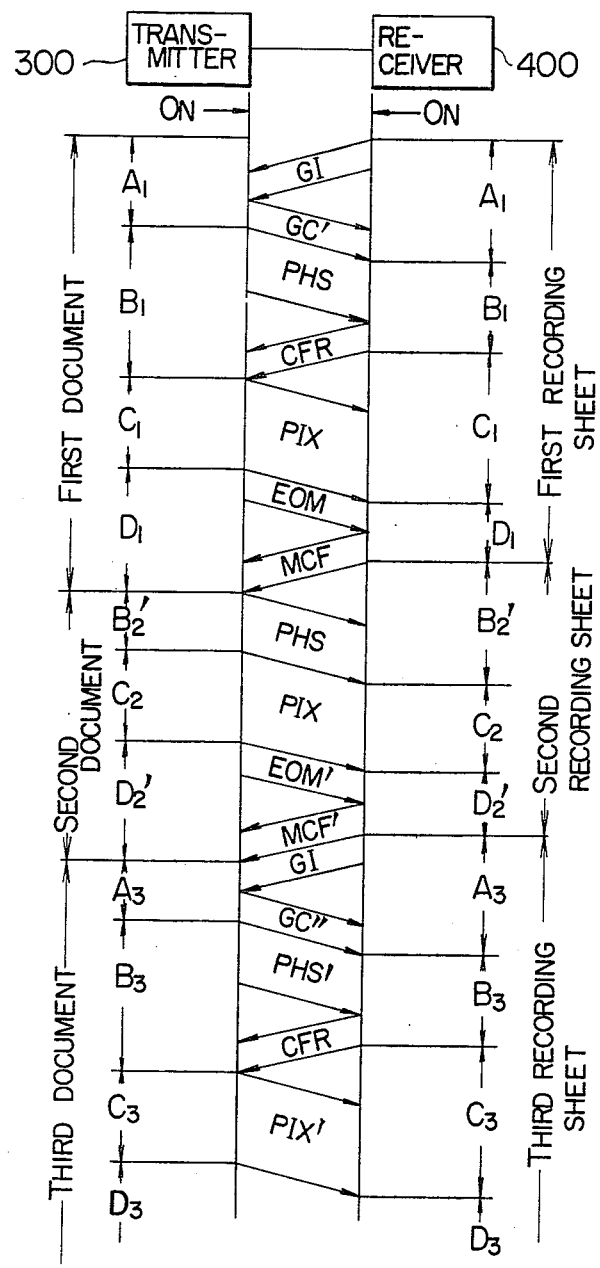
FIG. 6 shows in a flow chart an example of communication between the transmitter and the receiver according to the invention.

The transmission of information between the transmitter 300 and the receiver 400 described above is performed in a manner illustrated in FIG. 6, which is depicted on the assumption that three sheets of documents are to be successively transmitted in facsimile, wherein the picture information for the first and the second originals are to be sent in the same transmission mode with the preparatory procedures being omitted for the second document, while a mode change is made for the sending of the third document information.

Figure 7:
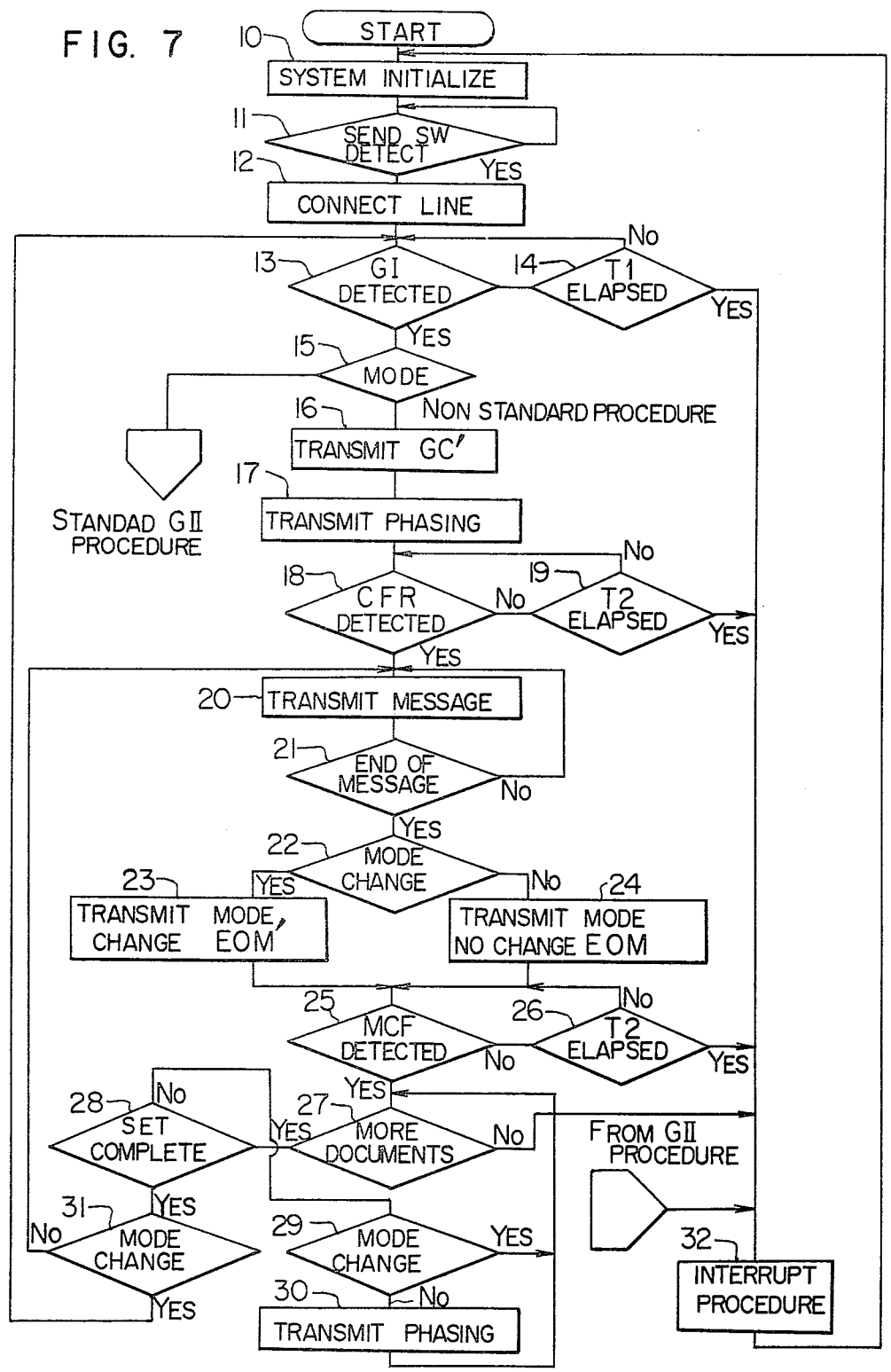
FIG. 7 shows in a flow chart a program for controlling the operation of the transmitter shown in FIG. 4.

Referring to FIG. 7 which shows a flow chart illustrating a program for controlling the operations of the transmitter, the control program for the transmitter is started when the transmitter is switched to a power source, whereby the transmitter is set to the initial state (initialization) as a whole at a step 10. It is assumed that the first document to be sent is set at the reading position. Operation of the transmitter then depresses a send switch thereby to command the control unit to connect the transmitter to the communication line at the step 11. When the command is detected by the control unit, the transmitter is connected to the communication line at the step 12. Thereafter, the transmitter waits for the incoming group identifying signal GI from the receiver for an interval of T1 seconds (T1=30 to 40 sec.) at the steps 13 and 14. When the group identifying signal GI is received and processed, an operation mode is selected under the command of operator thereby to send the group command signal GC' at the step 16. The preparatory procedure omitting mode (i.e. non-standard) according to the invention is deviated from the standard as decided at the step 15, wherein a signal GC' frequency different from GC of the standard mode stipulated in CCITT's Recommendation T-3 is used. Although one and the same machine may have a plurality of non-standard modes so far as the standard mode is not thereby adversely interfered, it is necessary that the group command signal GC and the phasing signal PHS are to be discriminated from each other. Since the standard mode is described in CCITT's Recommendation (1976, p. 190), further description will be unnecessary. In succession to the transmission of the group command signal GC', the phasing signal PHS is sent at the step 17. After the completed transmission of the signal PHS, the transmitter waits for the reception-ready (confirmation-to-receive) signal CFR transmitted from the receiver (step 18) for a period of T2 (T2≈3 sec.) at the step 19. When the signal CFR is detected during the period T2, picture information of the document to be transmitted is read out by a photoelectric converter system in succession to the reception of the signal CFR to prepare a message in the form of the picture information signal PIX through the signal processing unit, which signal is modulated through the modulating unit and transferred to the communication line through the input/output interface at the step 20. When the reading means indicates the termination of the document as scanned at the step 21, the transmitter then sends out the signal EOM in succession to the picture information. However, if the operating mode of the second document is to be changed at that time in respect of the line density, data compression or the like (step 22), the end-of-message signal EOM' informing the change in mode is sent out at the step 23. Otherwise, the standard end-of-message signal EOM is sent out at the step 24. After completion sending of the signal EOM, the transmitter is set to the position to detect the signal MCF from the receiver at the step 25. The detecting operation for the signal MCF is performed during an interval of T2 at the step 26. Upon reception of the signal MCF, it is determined whether there is a next document to be sent at the step 27. Such determination is effected by a document detecting switch located at an appropriate position except for the reading position or by means of a switch of an automatic sheet supply apparatus which is adapted to detect the stacked state of documents to be successively fed to the scanning station. When the document next to be sent is detected, the control unit is set to the stand-by state until the concerned document has been positioned at the reading location (step 28). During the stand-by state, the phasing signal PHS is sent out in the same scanning timing as in the case of the preceding document (steps 29, 30) when the operation mode is not required to be changed, i.e. when the standard end-of-message signal EOM has been sent. Otherwise, no signal is sent out. When the document has attained the position to be read, the transmitter is in the position to detect again the group identifying signal GI in the case where the operation mode is to be changed or alternatively to send the picture information of the new document in succession to the phasing signal PHS when the operation mode is not to be altered (step 31). In the meantime, when there is no document next to be sent or when signal to be detected is absent, the program proceeds to an interrupt procedure at the step 32, whereby the transmitter is disconnected from the communication line to terminate the transmission and reset to the initial state to wait for a new command of operator.

Figure 8:
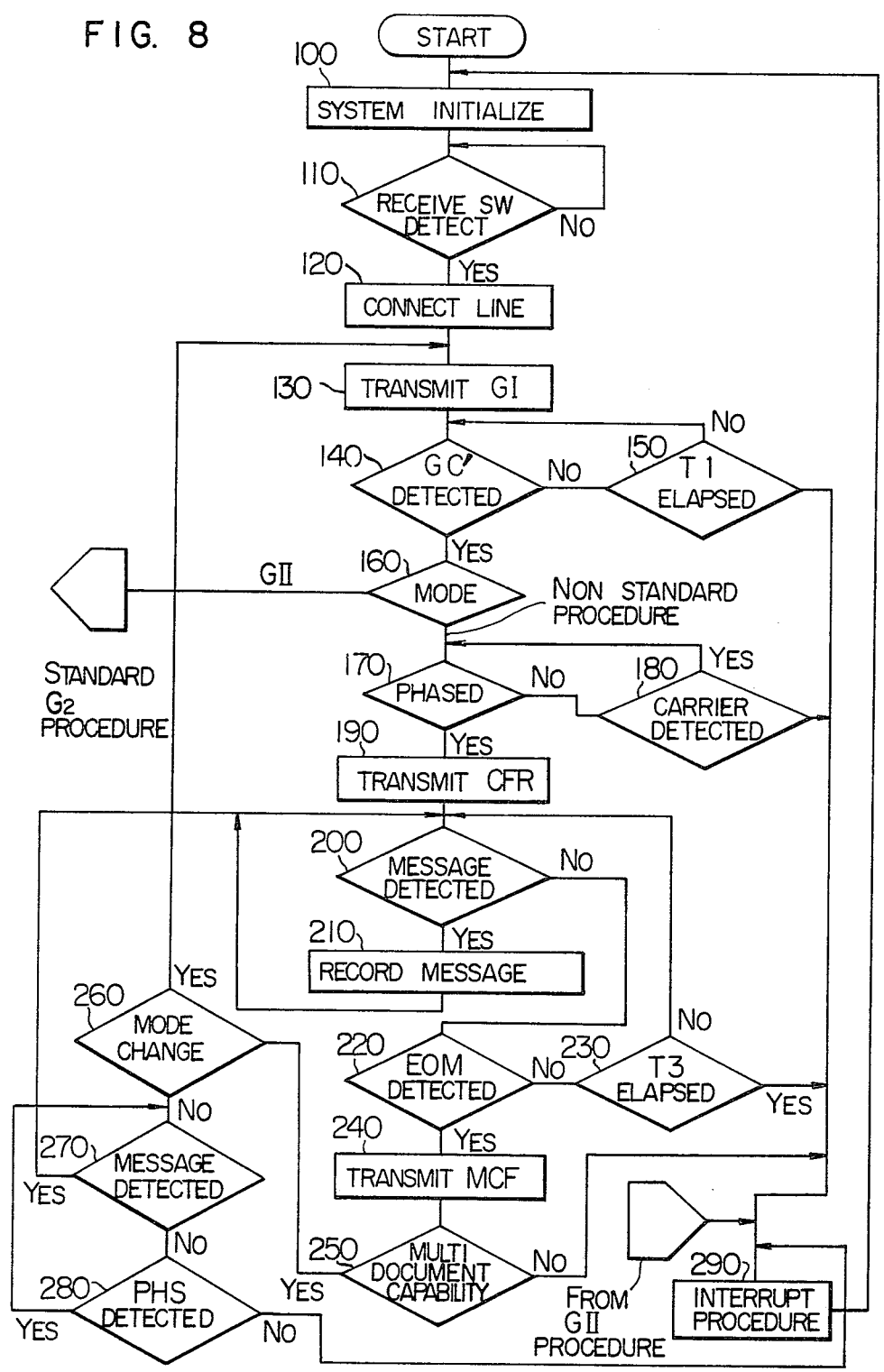
FIG. 8 is a flow chart to illustrate a program for controlling the operation of the receiver shown in FIG. 5.

Referring to FIG. 8 which is a flow chart for illustrating a program to control the operations of the receiver shown in FIG. 5, it will be understood that the steps 100 to 120 for connecting the receiver to the communication line are executed in a substantially same manner as the case of the transmitter. When the receiver has been connected to the communication line, the receiver detects the group command signal GC' (step 140) or continues to send the group identifying signal GI until the time interval T1 (30 to 40 sec.) has lapsed (step 130). When the group command signal GC is detected, it is determined whether the signal GC is in the standard mode (CCITT's Recommendation T-3) at the step 160. If the standard mode is confirmed, the program is branched to the procedures described in CCITT's Recommendation T-30 (1976), p. 190. It should be noted that even in the case of the non-standard procedure in which the preparatory procedures can be omitted as described hereinbefore, no alteration is made to the tonal signal in order to assure the capability to communicate with the standard facsimile machines. When it is determined from the group command signal GC that the transmission is to be performed in the non-standard mode and that the mode in concern is shared in common by the receiver and the transmitter, the phase matching is effected by the phasing signal PHS received in succession to the group command signal GC (step 170). The phase matching continues to take place so far as incoming signal is present (step 180). When the phase matching has been established, the reception-ready (confirmation-to-receive) signal CFR is sent in succession to the termination of the phasing signal PHS (step 190). With the aid of the signal CFR, the receiver can inform the transmitter of the fact that the transmission in the non-standard mode is allowed. After the signal CFR has been sent, the incoming picture information signal PIX is detected (step 200) and demodulated through the demodulating unit to extract the synchronizing signal, whereby the remaining picture information signal PIX is recorded (step 210). In case the signal PIX is absent, the end-of-message signal EOM is then to be detected (220). In consideration of the fact that the picture information signal PIX might be missing due to the prevailing traffic conditions at the communication line, the operation to detect the signal EOM has to be maintained at least for an interval T3 (one second) at the step 230. In response to the detection of the incoming end-of-message signal EOM, the receiver sends the message confirmation signal MCF (step 240). The signal MCF may contain the information as to whether the preparatory procedure omission is available. After the signal MCF has been sent, it is determined from the signal EOM whether a mode change is commanded or not (step 250), when the receiver is capable of receiving subsequent documents in succession (step 250). If the mode change is commanded, the receiver is set to the starting state to send the group identifying signal GI (step 130). Otherwise, the receiver operates to detect either the picture information signal PIX or the phasing signal PHS (step 270 or 280). Upon detection of the signal PIX, reception and recording are performed (steps 200 and 210). On the other hand, when the phasing signal PHS is detected, the receiver waits for the incoming picture information signal PIX. The absence of any incoming signals will means termination of the document at the side of the transmitter. The program may then proceed to the interrupt procedure (step 290) which is usually carried out when no incoming signals are present from the counterpart transmitter for predetermined waiting durations or when the phasing signal PHS has been terminated without involving the phase matching. As the consequence of the interrupt procedure, the receiver is disconnected from the communication line and set to the initial state to wait for the command of operator, as is in the case of the transmitter.

Figure 3:
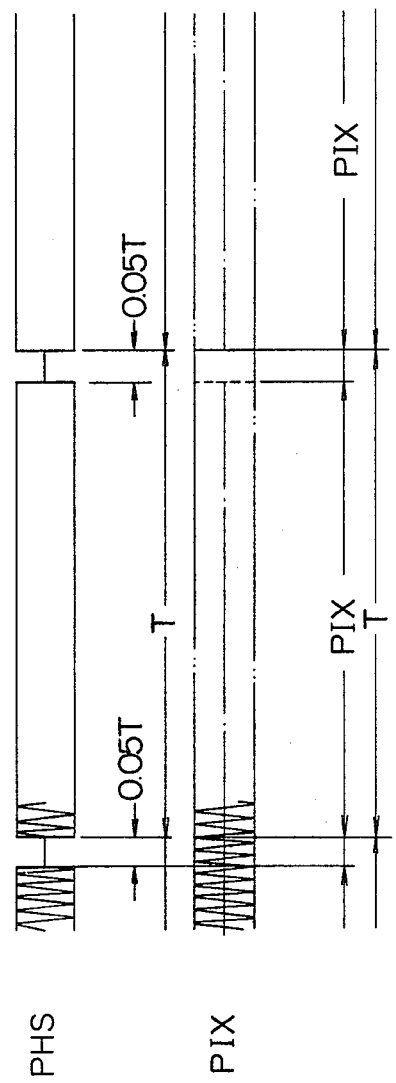

As will be appreciated from the foregoing description, although the transmission procedures for the first document are carried out in the same manner as the hitherto known method, there is produced according to the teaching of the invention the second type group command signal GC' for the second and subsequent documents to be successively sent, which signal indicates that the preparatory procedure be omitted. Accordingly, the receiver 400 waits for the phasing signal PHS or the picture information (message) signal PIX after having sent the message confirmation signal MCF. Upon reception of the signal MCF, the transmitter 300 operates to set the document next to be sent at the scanning position for reading, while sending simultaneously the phasing signal PHS to establish the pase matching at the receiver station. The setting of the document at the reading position can be detected by means of microswitches or photo-couplers. During the preparatory interval described above, the receiver waits for the incoming picture information signal PIX without proceeding to the recording operation. Interruption in reception as well as deviation of the established scanning phase is maintained by the phasing signal sent from the transmitter. It should be mentioned that when the setting of the second document has been accomplished rapidly, e.g. when the second document has been properly positioned during the transaction of the end-of-message signal EOM and the message confirmation signal MCF, the phasing signal PHS may be omitted, provided that the picture information signal PIX for the second document can be transmitted immediately after the message confirming signal MCF in the data transmission for the first document. In the case of the example illustrated in FIG. 6, the end-of-message signal EOM' containing the mode change command is issued upon termination of the picture information signal PIX for the second document. However, in the case that the picture information for the third and subsequent documents are to be transmitted successively in the same mode, the end-of-message signal EOM containing no mode change command is produced. It will be seen that the transmission illustrated in FIG. 3 has been described on the assumption that the transmission mode is changed for the third document. In this case, the receiver 300 and the transmitters 400 receive and send the group identifying signal GI, the new grow command signal GC'', the phasing signal PHS' and the picture information signal PIX'.

The group command signal GC' containing the information of the omitted transmission mode and the end-of-message signal EOM' as well as the message confirming signal containing the information of mode change can be discriminated from one another by changing the frequencies allotted to these signals. Further, the feeding of the documents and the recording sheets in the case of the successive transmission may be carried out during the periods of the end-of-message signal EOM, the message confirming signal MCF and the phasing signal PHS.

In this way, the preparatory procedures can be omitted for the transmission of the second document (i.e. the signals GI, GC and CFR are omitted), whereby the transmission efficiency can be significantly improved in the successive transmission of a number of documents in the same transmitting mode.

In the exemplary embodiments described above, the operations of the Group II apparatus stipulated in CCITT's Recommendation are selected as the standards. Accordingly, the AM-PM-VSB modulation is adopted. However, it will be appreciated that other types of modulation such as FF and AM-DSB modulations may be adopted in carrying out the transmitting method according to the invention.

For further simplification, it is also possible to transmit the picture information signal PIX for the second document by omitting the end-of-message signal EOM and the message confirming signal MCF while placing the phasing signal in succession to the picture information signal for the first document with a view to making available the time for replacing the documents and the recoring sheets. Further, the end-of-message signal EOM may be made use of as the signal informing the successive transmission of the picture information for a plurality of documents in the same transmitting mode.

It will now be appreciated that the utilization efficiency of communication lines or channels can be significantly enhanced by reducing the preparating time for the successive transmission of a plurality of original documents according to the teaching of the invention.

What we claim is:

1. A picture information transmitting method for a facsimile system comprising steps of;

sending a group identifying signal by receiver informing that the receiver is in a reception ready mode, transmitting a group command signal by a transmitter which has determined a transmitting mode in response to the received group identifying signal, transmitting a phasing signal by the transmitter in succession to termination of the group command signal, sending a reception-ready signal by the receiver when preparatory conditions for receiving picture information have been established in the receiver on the basis of the group command signal and the phasing signal, transmitting the picture information signal of document to be transmitted by the transmitter after the reception of the reception-ready signal, recording the picture information as received by the receiver, transmitting the end-of-message signal by the transmitter upon completed transmission of the picture information signal of the document, sending a message confirmation signal by the receiver after reception of the end-of-message signal, wherein transmission of the picture information of a second document in succession to the picture information of the first document in the same transmitting mode, the transmission and the reception of at least the group identifying signal and the group command signal are omitted, which omission is previously informed to the receiver so that the receiver remains in the state ready for reception of the picture information of the second document, whereby the picture information of the second document as sent out from the transmitter is immediately received and recorded by the receiver.

2. A method of transmitting picture information according to claim 1, wherein omission of at least the group identifying signal and the group command signal from transmission is informed to the receiver with the aid of said group command signal.

3. A method of transmitting picture information according to claim 1, wherein the transmitter sends the phasing signal during a interval for preparing transmission of the picture information for the second document, while the receiver performs phase correction in accordance with said phasing signal and is thereby maintained in the state ready for receiving the picture information.

4. A method of transmitting picture information according to claim 1, further including steps of transmitting and end-of-message signal by the transmitter after the transmission of the picture information for the first document has been completed, and sending a message confirming signal by the receiver after reception of said end-of-message signal, wherein transmission of the group identifying signal and the group command signal is omitted, said omission being informed to the receiver.

5. A method of transmitting picture information according to claim 4, wherein the omission of the group identifying signal and the group command signal from transmission is informed to the receiver by the group command signal.

6. A method of transmitting picture information according to claim 4, wherein omission of the group identifying signal and the group command signal is informed to the receiver by the end-of-message signal.

7. A method of transmitting picture information according to claim 4, wherein the transmitter sends the phasing signal during the time interval for preparing the transmission of the picture information for the second document in succession to the message confirming signal, while the receiver performs the phase correction in accordance with the phasing signal and is thereby maintained in the state ready for receiving the picture information.

8. A method of transmitting picture information according to claim 1, wherein when transmission mode is changed in the course of successive transmission in the same transmitting mode, the end-of-message signal containing the information of the mode change is transmitted from the transmitter to the receiver thereby to clear the information of the signal omission stored previously in the receiver.

* * * * *